US012783953B2

(12) United States Patent
Andrews et al.

(10) Patent No.: US 12,783,953 B2
(45) Date of Patent: Nov. 3, 2026

(54) SYSTEMS AND METHODS FOR MITIGATING BIAS IN MACHINE LEARNING MODELS

(71) Applicant: Verizon Patent and Licensing Inc., Basking Ridge, NJ (US)

(72) Inventors: Joshua Scott Andrews, Raleigh, NC (US); Wei Sun, Fairfax, VA (US); Xuning Tang, Mclean, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 633 days.

(21) Appl. No.: 18/349,409

(22) Filed: Jul. 10, 2023

(65) Prior Publication Data

US 2025/0021868 A1 Jan. 16, 2025

(51) Int. Cl.
*G06F 16/00* (2019.01)
*G06N 20/00* (2019.01)

(52) U.S. Cl.
CPC .................................... *G06N 20/00* (2019.01)

(58) Field of Classification Search
CPC ................................ G06N 20/00; G06N 7/01
See application file for complete search history.

(56) References Cited

U.S. PATENT DOCUMENTS 11,106,793 B2 * 8/2021 Grafi ..................... G06F 21/568
12,443,674 B1 * 10/2025 Blanchard ............... G06F 17/11
2021/0073675 A1 * 3/2021 Ribera Prat ............. G06F 17/18
2021/0158204 A1 * 5/2021 Natesan Ramamurthy ................. G06N 20/00
2022/0318640 A1 * 10/2022 Malur Srinivasan .... G06N 5/01
2023/0237036 A1 * 7/2023 Piao .................... G06F 16/2272 707/741
2023/0394358 A1 * 12/2023 Lam ......................... G06N 7/01
2024/0242126 A1 * 7/2024 Lam ....................... G06N 20/20
2024/0346385 A1 * 10/2024 Lam ....................... G06N 20/20
2024/0386015 A1 * 11/2024 Crabtree ............... G06F 16/245

(Continued)

OTHER PUBLICATIONS

Kamiran et al., "Classification with No Discrimination by Preferential Sampling," Informal proceedings of the 19th Annual Machine Learning Conference of Belgium and The Netherlands, 2010, 6 Pages.

(Continued)

*Primary Examiner* — Noosha Arjomandi

(57) ABSTRACT

A device may receive protected attribute data, observation data, and target variable data associated with a machine learning model, and may include intersectional groups in the protected attribute data to expand a quantity of demographic subgroups and to generate modified protected attribute data. The device may calculate an expected proportion of individuals with the modified protected attribute data being in a particular group and the target variable data being positive, and may calculate an observed proportion of individuals with the modified protected attribute data being in the particular group and the target variable data being positive. The device may determine observation weights based on the expected proportion and the observed proportion, and may utilize the observation data and the observation weights to train the machine learning model and generate a trained machine learning model.

20 Claims, 15 Drawing Sheets

(56) References Cited

U.S. PATENT DOCUMENTS

2025/0021868 A1* 1/2025 Andrews .................. G06N 7/01
2025/0337519 A1* 10/2025 Chu .................. H04W 28/0278

OTHER PUBLICATIONS

Zhao et al., "Maximum Relevance and Minimum Redundancy Feature Selection Methods for a Marketing Machine Learning Platform," IEEE International Conference on Data Science and Advanced Analytics (DSAA), Aug. 15, 2019, 11 Pages.
Steinberg et al., "Fairness Measures for Regression via Probabilistic Classification," 2nd Ethics of Data Science Conference, Mar. 5, 2020, 9 Pages.
Bellamy et al., "AI Fairness 360: An Extensible Toolkit for Detecting, Understanding, and Mitigating Unwanted Algorithmic Bias," IBM Journal of Research and Development, Oct. 3, 2018, 20 Pages.
Bird et al., "Fairlearn: A toolkit for assessing and improving fairness in AI," Microsoft Technology Report, MSR-TR-2020-32, 2020, 7 Pages.
Klumbyte et al., "Critical Tools for Machine Learning: Working with Intersectional Critical Concepts in Machine Learning Systems Design," ACM Conference on Fairness, Accountability, and Transparency (FAccT '22), Jun. 2022, 14 Pages.
Mehrotra et al., "Selection in the Presence of Implicit Bias: The Advantage of Intersectional Constraints," ACM Conference on Fairness, Accountability, and Transparency (FAccT '22), Jun. 2022, 51 Pages.
Hort et al., "Bias Mitigation for Machine Learning Classifiers: A Comprehensive Survey," Association for Computing Machinery, Oct. 11, 2023, 52 Pages.
Wang et al., "Towards Intersectionality in Machine Learning: Including More Identities, Handling Underrepresentation, and Performing," ACM Conference on Fairness, Accountability, and Transparency (FAccT '22), Jun. 2022, 14 Pages.
Yang et al., "Fairness With Overlapping Groups," Proceedings of 34th Conference on Neural Information Processing Systems (NeurIPS), Jun. 2020, 20 Pages.
Lalor et al., "Benchmarking Intersectional Biases in NLP," Proceedings of the 2022 Conference of the North American Chapter of the Association for Computational Linguistics: Human Language Technologies, Jul. 2022, 12 Pages.
Qian et al., "Solving High-Dimensional Multi-Objective Optimization Problems with Low Effective Dimensions," Proceedings of the Thirty-First AAAI Conference on Artificial Intelligence (AAAI-17), Feb. 2017, 7 Pages.
Nyoman Gunantara, "A review of multi-objective optimization: Methods and its applications," Cogent Engineering, Aug. 2018, 17 Pages.
Quy et al., "A survey on datasets for fairness-aware machine learning," WIREs Data Mining and Knowledge Discovery, Jan. 2022, 59 Pages.
Dua et al., UCI Machine Learning Repository, Communities and Crime Dataset, Website: http://archive.ics.uci.edu/ml, Jul. 2019, 17 Pages.
Pessach et al., "A Review on Fairness in Machine Learning," ACM Computing Surveys, vol. 55, No. 3, Article 51, Mar. 2023, 44 Pages.
Mehrabi et al., "A Survey on Bias and Fairness in Machine Learning," ACM Computing Surveys, vol. 54, No. 6, Article 115, Jul. 2022, 34 Pages.
Zhang et al., "Mitigating Unwanted Biases with Adversarial Learning," AAAI/ACM Conference on AI, Ethics, and Society (AIES), Feb. 2018, 7 Pages.
Kamishima et al., "Fairness-Aware Classifier with Prejudice Remover Regularizer," Machine Learning and Knowledge Discovery in Databases, 2012, 35 Pages.
Dwork et al., "Fairness Through Awareness," Proceedings of the 3rd Innovations in Theoretical Computer Science Conference (ITCS), 2012, 24 Pages.
Kamiran et al., "Data preprocessing techniques for classification without discrimination," Knowl Inf Syst, 2012, 33 Pages.
Agarwal et al., "A Reductions Approach to Fair Classification," International Conference on Machine Learning (ICML), 2018, 18 Pages.
Ishibuchi et al., "Evolutionary Many-Objective Optimization: A Short Review," of 2008 IEEE Congress on Evolutionary Computation, Jun. 2008, 8 Pages.
Santiago et al., "A Survey of Decomposition Methods for Multiobjective Optimization," Studies in Computational Intelligence, vol. 547, 2001, 16 Pages.
Elarbi et al., "A New Decomposition-Based NSGA-II for Many-Objective Optimization," IEEE Transactions On Systems, Man, and Cybernetics: Systems, vol. 48, No. 7, Jul. 2018, 20 Pages.
Foulds et al., "An Intersectional Definition of Fairness," IEEE 36th International Conference on Data Engineering (ICDE), 2020, 14 Pages.
Mohammadi et al., "A New Performance Metric for User-preference Based Multi-objective Evolutionary Algorithms," IEEE Congress on Evolutionary Computation, Jun. 2013, 8 Pages.
Kievit et al., "Simpson's paradox in psychological science: a practical guide," Frontiers in Psychology, Aug. 2013, 14 Pages.
Peng et al., "Feature Selection Based on Mutual Information: Criteria of Max-Dependency, Max-Relevance, and Min-Redundancy," IEEE Transactions on Pattern Analysis and Machine Intelligence, vol. 27, No. 8, Aug. 2005, 13 Pages.
Zhao et al., "Maximum Relevance and Minimum Redundancy Feature Selection Methods for a Marketing Machine Learning Platform," IEEE International Conference on Data Science and Advanced Analytics (DSAA), 2019, 11 Pages.
Jacob Cohen, "Statistical Power Analysis for the Behavioral Sciences, Second Edition" 1988, 579 Pages.
Bruce Thompson, "Effect Sizes, Confidence Intervals, and Confidence Intervals for Effect Sizes," Psychology in the Schools, vol. 44, No. 5, 2007, 10 Pages.
Daniël Lakens, "Calculating and reporting effect sizes to facilitate cumulative science: a practical primer for t-tests and ANOVAs," Frontiers in Psychology, Nov. 2013, 12 Pages.
Ding et al., "Retiring Adult: New Datasets for Fair Machine Learning," Advances in Neural Information Processing Systems (NeurIPS), 2021, 58 Pages.
Python Package Index—PyPI. (n.d.), Category Encoders, Python Software Foundation, Website https://https://pypi.org/project/category-encoders/, Obtained Mar. 2024, 6 Pages.
U. S. Equal Employment Opportunity Commission (EEOC), niform Guidelines on employee selection procedures. Tech. Rep., EEOC, Website: https://www.govinfo.gov/content/pkg/CFR-2017-title29-vol4/xml/CFR-2017-title29-vol4-part1607.xml, 1979, 26 Pages.
Feldman et al., "Certifying and removing disparate impact," Proceedings of the 21th ACM SIGKDD International Conference on Knowledge Discovery and Data Mining, 2015, 28 Pages.
Prokhorenkova et al., "CatBoost: unbiased boosting with categorical features," Proceedings of the 32nd International Conference on Neural Information Processing Systems (NIPS), 2018, 11 Pages.

* cited by examiner

SYSTEMS AND METHODS FOR MITIGATING BIAS IN MACHINE LEARNING MODELS

BACKGROUND

A machine learning model may determine a relationship between one or more independent variables and a response, dependent, or target variable.

DETAILED DESCRIPTION OF EXAMPLE EMBODIMENTS

Figure 1A:
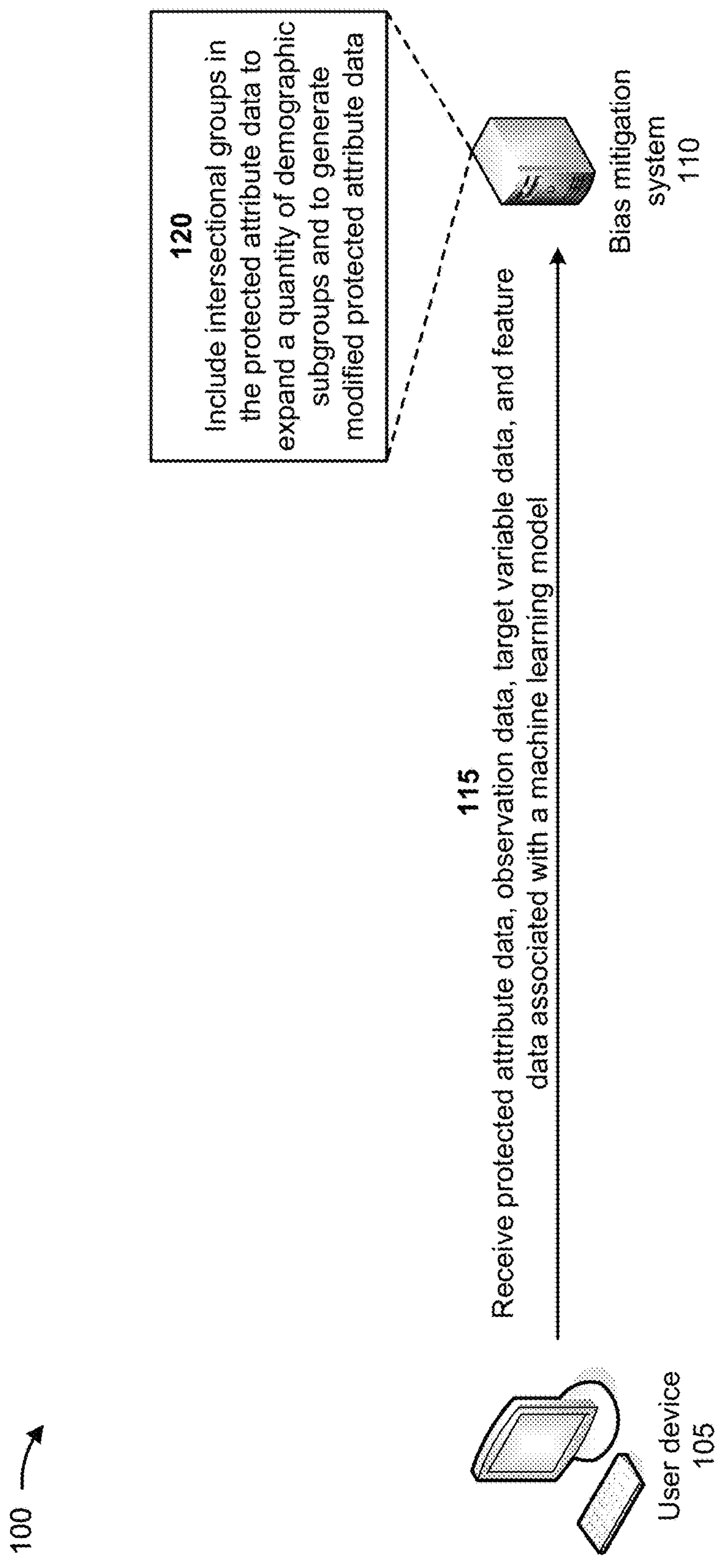
FIGS. 1A-1K are diagrams of an example associated with mitigating bias in machine learning models.

The following detailed description of example implementations refers to the accompanying drawings. The same reference numbers in different drawings may identify the same or similar elements.

Machine learning models may generate biased results due to being trained with biased training data. Over the past few years, bias mitigation approaches for machine learning models have seen increasing research attention. There now exists a number of different approaches and open-source tools for incorporating mitigation strategies into applied contexts. Nonetheless, there exists a common gap between typical research methods and requirements of real-world mitigation strategies, which is a level of detail applied to subgroup analytics as a necessity for comprehensive bias measurement. Several of the approaches for bias mitigation have restricted the breadth of protected attributes during model testing by focusing on a singular, binary attribute such as gender or binarized race.

Regardless of specific approach, a high-level goal of bias mitigation is minimizing bias in a machine learning model using a selected bias measurement that is often use-case specific (e.g., demographic parity). Therefore, the measurement of bias is a universally important aspect of bias mitigation research. Regardless of the approach or underlying optimization framework, accurate measurement of bias is required for the effectiveness of any approach.

Bias mitigation approaches, specifically pertaining to supervised machine learning models, are broadly classified into three categories: pre-processing, in-processing, and post-processing. These categories reference where the approach is applied within the model building pipeline (e.g., before, during, or after model training). Pre-processing approaches act upon data, such as through resampling or through creation of observation weights that are passed to a machine learning model. In-processing approaches optimize directly on fairness during model training. Post-processing approaches act on the output of predictive models. Of the three categories, pre-processing approaches are most well-suited for model agnostic approaches. In-processing often requires specialized architectures or access to an optimizer for the purpose of regularization, making model agnostic approaches more difficult. Post-processing requires alteration of model output based on demographic information, which may reduce feasibility because of disparate impact violations.

Thus, current systems for mitigating bias in machine learning models consume computing resources (e.g., processing resources, memory resources, communication resources, and/or the like), networking resources, and/or other resources associated with failing to generate unbiased machine learning models, erroneously utilizing biased results generated by biased machine learning models, attempting to correct biased machine learning models, failing to identify biased machine learning models, and/or the like.

Some implementations described herein provide a bias mitigation system that mitigates bias in machine learning models. For example, the bias mitigation system may receive protected attribute data, observation data, and first target variable data associated with a first machine learning model, and may include intersectional groups (e.g., demographics) in the protected attribute data to expand a quantity of demographic subgroups and to generate modified protected attribute data. The bias mitigation system may calculate an expected proportion of individuals with the modified protected attribute data being in a particular group and the first target variable data being positive, and may calculate an observed proportion of individuals with the modified protected attribute data being in the particular group and the first target variable data being positive. The bias mitigation system may determine observation weights based on the expected proportion and the observed proportion, and may utilize the observation data and the observation weights to train the first machine learning model and generate a trained first machine learning model.

Alternatively, or additionally, the bias mitigation system may receive second target variable data and feature data associated with a second machine learning model, and may calculate a bias measure based on the feature data and a bias metric. The bias mitigation system may calculate feature values between the feature data and the second target variable data, and may calculate a redundancy based on average feature correlations between each feature of a set of features included in the feature data and remaining features of the set of features included in the feature data. The bias mitigation system may perform normalization (e.g., min-max normalization) on the feature values and the bias measure to generate normalized feature values and a normalized bias measure, and may subtract the normalized bias measure from the normalized feature values to generate a combined relevance and bias objective. The bias mitigation system may divide the combined relevance and bias objective by the redundancy to determine feature data (e.g., F-test correlation quotient (FCQ) feature data), and may utilize the feature data to train the second machine learning model and generate a trained second machine learning model (e.g., that is not biased).

In this way, the bias mitigation system mitigates bias in machine learning models. For example, the bias mitigation system may expand upon previous bias mitigation approaches, and may distinguish between multi-attribute mitigation, intersectional mitigation, and multi-objective analysis. The bias mitigation system may consider multiple protected attributes simultaneously in both model training and evaluation, and may demonstrate how to programmatically apply these concepts by modifying a feature selection model to mitigate model bias and extending a reweighting-based bias mitigation model to handle intersectional protected attributes. The bias mitigation system may provide a more fine-grained, multi-attribute evaluation when determining if machine learning models have achieved sufficient bias mitigation. Thus, the bias mitigation system may conserve computing resources, networking resources, and/or other resources that would have otherwise been consumed by failing to generate unbiased machine learning models, erroneously utilizing biased results generated by biased machine learning models, attempting to correct biased machine learning models, failing to identify biased machine learning models, and/or the like.

FIGS. 1A-1K are diagrams of an example 100 associated with mitigating bias in machine learning models. As shown in FIGS. 1A-1K, example 100 includes a user device 105 associated with a bias mitigation system 110. Further details of the user device 105 and the bias mitigation system 110 are provided elsewhere herein.

As shown in FIG. 1A, and by reference number 115, the bias mitigation system 110 may receive protected attribute data, observation data, target variable data, and feature data associated with a machine learning model. For example, the user device 105 may process the protected attribute data and/or the feature data, with the machine learning model, to generate the observation data. A user of the user device 105 may provide the target variable data to the user device 105. The user device 105 may provide the protected attribute data, the observation data, the target variable data, and the feature data to the bias mitigation system 110, and the bias mitigation system 110 may receive the protected attribute data, the observation data, the target variable data, and the feature data. The protected attribute data (A) may include discrete random variables (e.g., gender, ethnic group, and/or the like) for sensitive (e.g., particular) groups for which fairness is evaluated. The observation data (O) may include continuous random variables representing a prediction of the machine learning model. The target variable data (Y) may include continuous random variables representing an expected or true target variable (e.g., an expected prediction) of the machine learning model. The feature data (X) may include a set of features in the observation data. For example, the user device 105 may provide race data, actual and expected predictions of the machine learning model, and features to the bias mitigation system 110.

As further shown in FIG. 1A, and by reference number 120, the bias mitigation system 110 may include intersectional groups in the protected attribute data to expand a quantity of demographic subgroups and to generate modified protected attribute data. For example, the bias mitigation system 110 may modify a pre-processing bias mitigation model designed to compensate for class imbalance in a single protected attribute (e.g., sex). The pre-processing bias mitigation model may create observation weights based on a weighting calculation. The pre-processing bias mitigation model may calculate the weights (W), for example, using females as the single protected attribute with a positive outcome on a binary target, based on the following equation:

$$W(O \mid O(A_{Sex}) = f \wedge O(Y),$$

wherein O represents an observation within a dataset (D), A represents a protected attribute (e.g., gender, race, age, and/or the like), Y represents a target variable, $O(A_{Sex})$ represents a value of an observation's (O) protected attribute ($A_{Sex}$), and O(Y) represents a value of the observation's (0) target variable.

In some implementations, the bias mitigation system 110 may modify the pre-processing bias mitigation model by expanding the demographic subgroups to include intersectional groups, as depicted in the following expression:

$$W(O \mid O(A_{Sex}) = f \wedge O(A_{Race}) = w \wedge O(Y) = +),$$

where the protected attribute A is a new encoding representing the intersection of sex and race variables. In one example, the sex and race may be white (w) females (f) who received a positive result on the binary target. In this context, the intersectionality is a means through which the pre-processing bias mitigation model can incorporate multiple attributes. This modification may result in a more nuanced redistribution of weights across intersectional groups, which in turn grants protection for marginal group memberships.

Figure 1B:
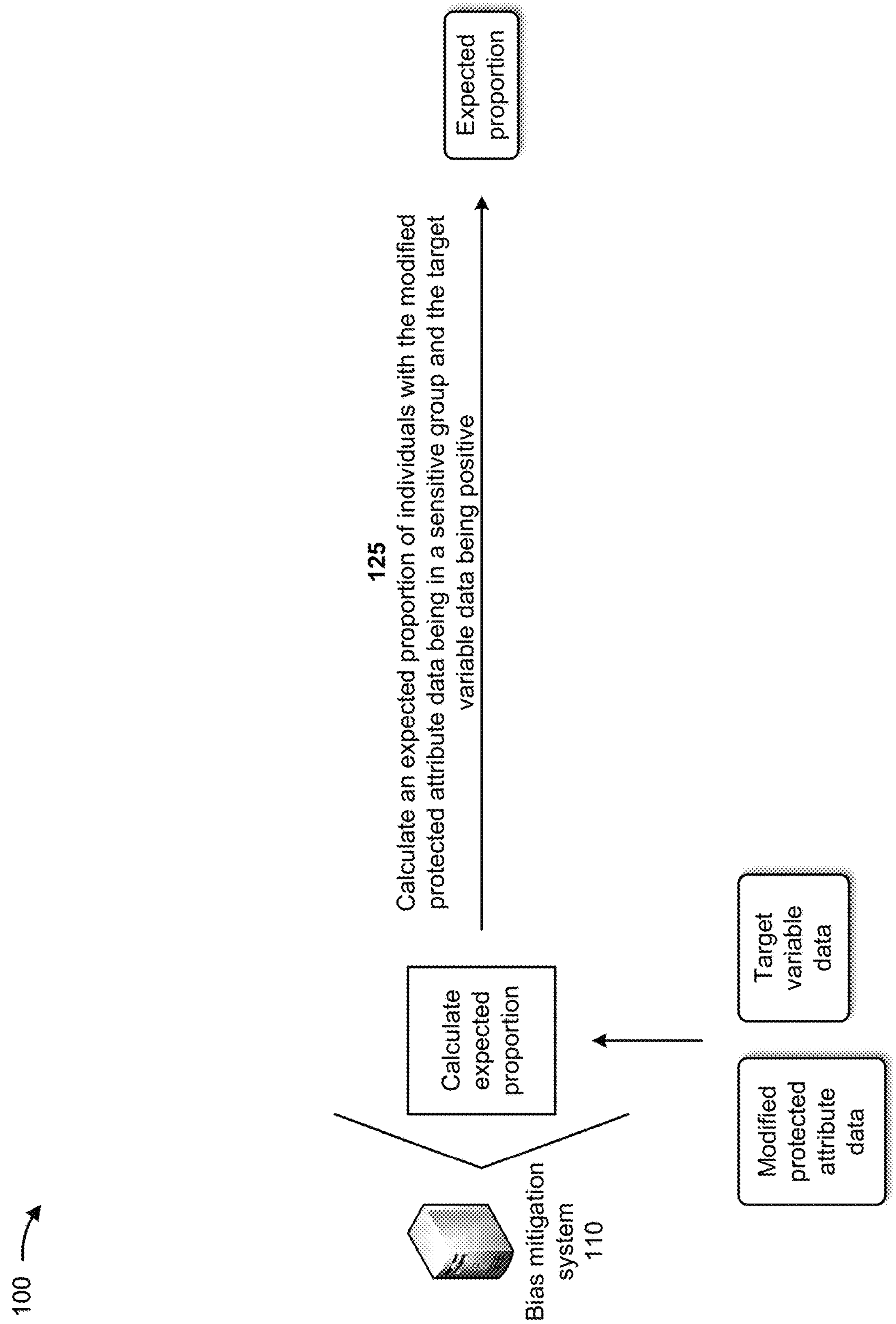

As shown in FIG. 1B, and by reference number 125, the bias mitigation system 110 may calculate an expected proportion of individuals with the modified protected attribute data being in a particular (e.g., sensitive) group and the target variable data being positive (e.g., more than likely). For example, the bias mitigation system 110 may calculate the expected proportion of individuals with the modified protected attribute data being in the sensitive group (e.g., white females) and the target variable data being positive, as follows:

$$P_{exp}(A_{Sex} = f \wedge A_{Race} = w \wedge Y = +),$$

where $A_{Sex}$=f represents a first protected attribute (e.g., sex) being female, $A_{Race}$=w represents a second protected attribute (e.g., race) being white, and Y=+ represents a target variable equaling a positive outcome. In some implementations, the bias mitigation system 110 may calculate the expected proportion of individuals with the modified protected attribute data being in the sensitive group (e.g., white females) and the target variable data being positive, as follows:

$$P_{exp} = \frac{|\{O \in D \mid O(A_{Sex}) = f \wedge O(A_{Race}) = w\}|}{|D|} \cdot \frac{|\{O \in D \mid O(Y) = +\}|}{|D|}.$$

Figure 1C:
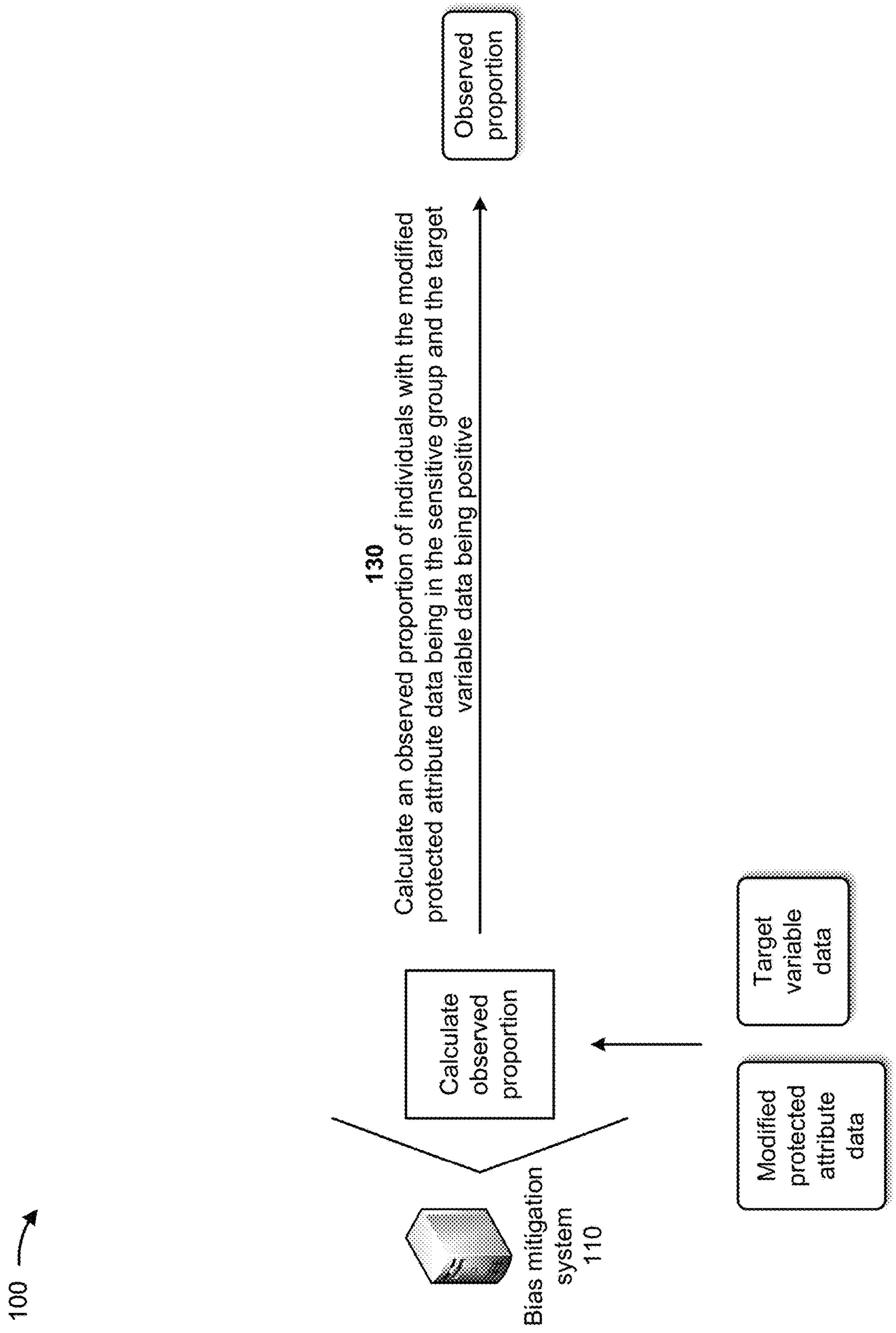

As shown in FIG. 1C, and by reference number 130, the bias mitigation system 110 may calculate an observed proportion of individuals with the modified protected attribute data being in the sensitive group and the target variable data being positive. For example, the bias mitigation system 110 may calculate the observed proportion of individuals with the modified protected attribute data being in the sensitive group (e.g., white females) and the target variable data being positive, as follows:

$$P_{obs}(A_{Sex} = f \wedge A_{Race} = w \wedge y = +),$$

where $A_{Sex}$=f represents the first protected attribute (e.g., sex) being female, $A_{Race}$=w represents the second protected attribute (e.g., race) being white, and Y=+ represents the target variable equaling a positive outcome. In some implementations, the bias mitigation system 110 may calculate the observed proportion of individuals with the modified protected attribute data being in the sensitive group (e.g., white females) and the target variable data being positive, as follows:

$$P_{obs} = \frac{|\{O \in D \mid O(A_{Sex}) = f \wedge O(A_{Race}) = w \wedge O(Y) = +\}|}{|D|}.$$

Figure 1D:
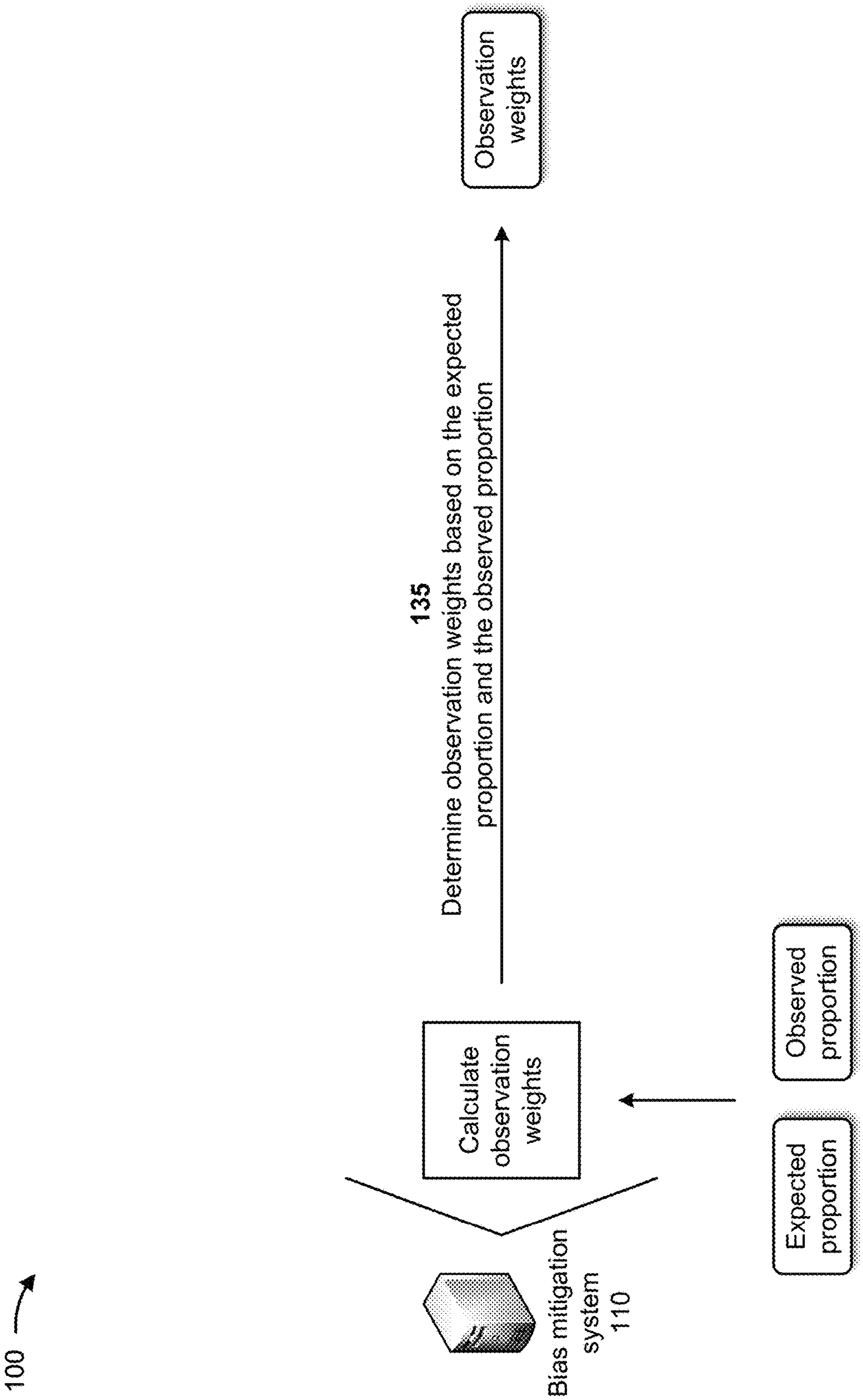

As shown in FIG. 1D, and by reference number 135, the bias mitigation system 110 may determine observation weights based on the expected proportion and the observed proportion. For example, the bias mitigation system 110 may determine the observation weights (W) based on the expected proportion and the observed proportion. In some implementations, the bias mitigation system 110 may determine the observation weights (W) based on dividing the expected proportion by the observed proportion, as follows:

$$W(O \mid O(A_{Sex}) = f \wedge O(A_{Race}) = w \wedge O(Y) = +) = \frac{P_{exp} = f \wedge A_{Race} = w \wedge Y = +)}{P_{obs}(A_{Sex} = f \wedge A_{Race} = w \wedge Y = +)}.$$

In this way, the bias mitigation system 110 may provide a more nuanced redistribution of weights across intersectional groups, which in turn grants protection for marginal group memberships in training data of the machine learning model.

Figure 1E:
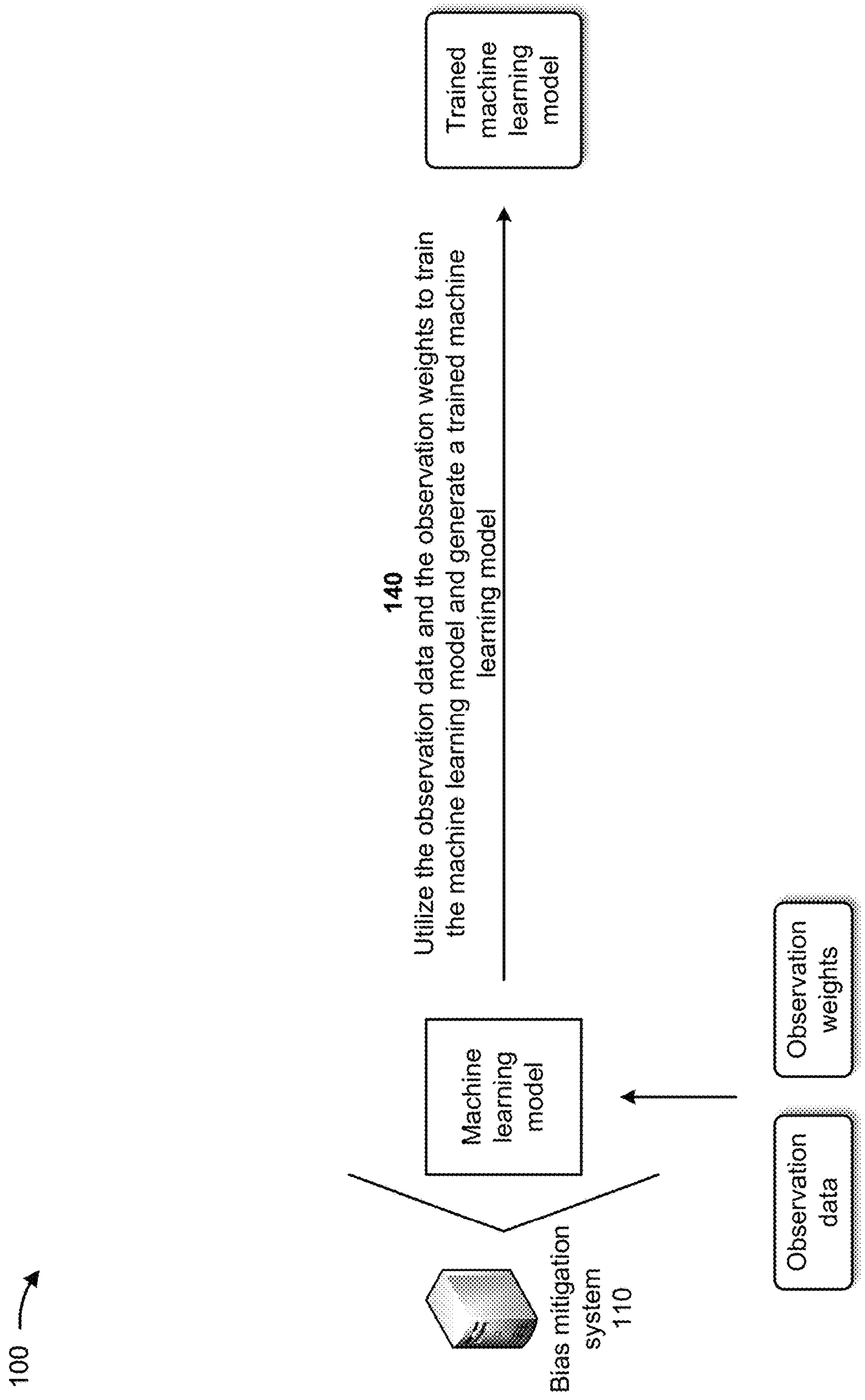

As shown in FIG. 1E, and by reference number 140, the bias mitigation system 110 may utilize the observation data and the observation weights to train the machine learning model and generate a trained machine learning model. For example, the bias mitigation system 110 may apply the observation weights to the observation data to generate weighted observation data. The bias mitigation system 110 may train the machine learning model with the weighted observation data to generate the trained machine learning model. In some implementations, the machine learning model may include a classifier machine learning model (e.g., xboost, catboost, and/or the like). In some implementations, the bias mitigation system 110 may utilize the trained machine learning model to make one or more predictions (e.g., with reduced bias relative to current approaches).

Figure 1F:
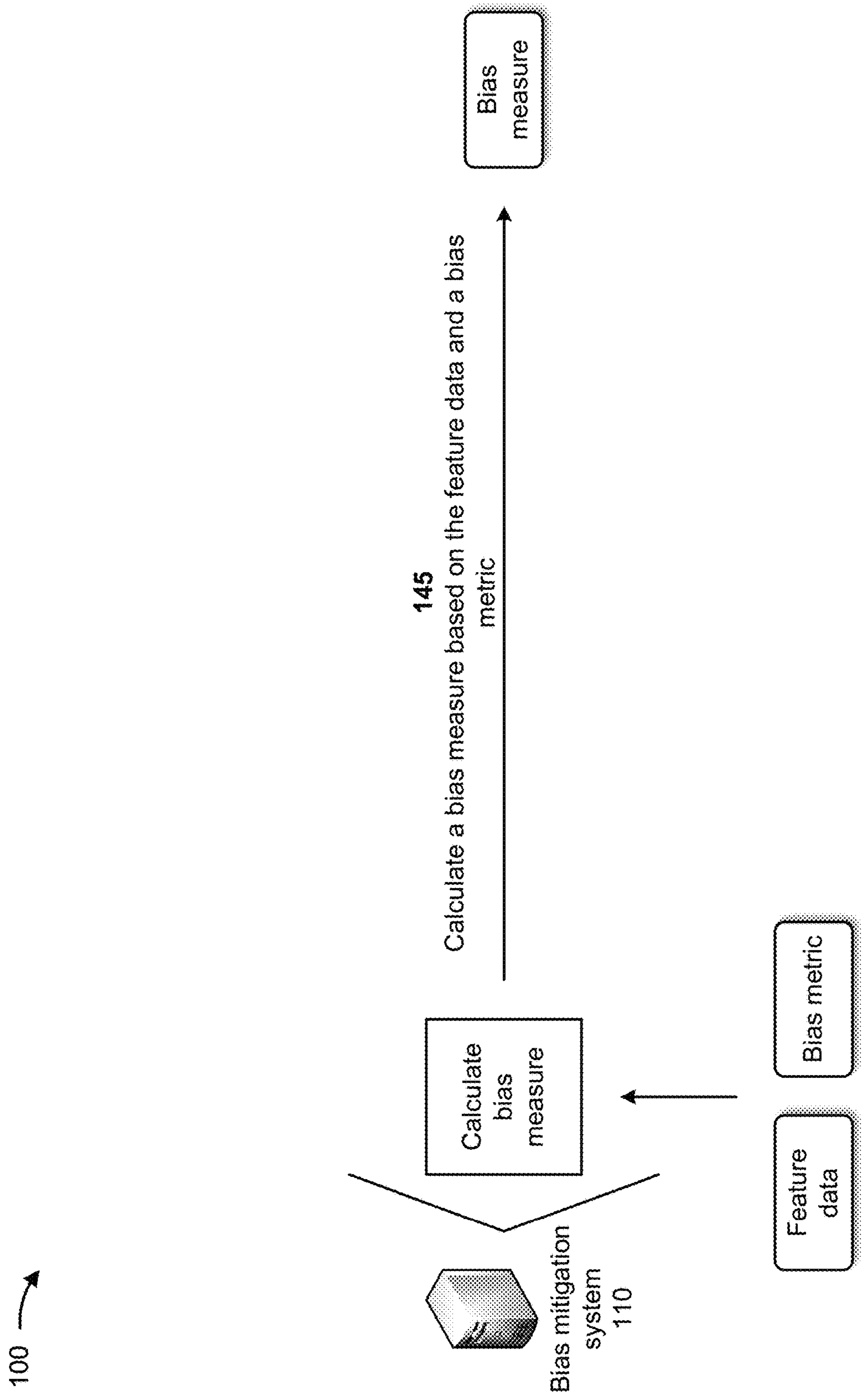

As shown in FIG. 1F, and by reference number 145, the bias mitigation system 110 may calculate a bias measure based on the feature data and a bias metric. For example, the bias mitigation system 110 may modify a maximum relevance minimum redundancy (MRMR) feature selection model to support bias mitigation by incorporating bias reduction as an additional objective of the MRMR feature selection model. The MRMR feature selection model provides a feature reduction approach to improving machine learning model accuracy. The MRMR feature selection model attempts to rank-order features based on incorporating each feature's relevance to a target, often measured using correlation, and redundancy of each feature with other selected features based on iterative selection. The MRMR feature selection model may output F-test correlation quotient (FCQ) feature data, as represented by the following equation:

$$F_{FCQ} = F(Y, X_i) / \left[\frac{1}{|S|}\sum_{X_s \in S} \rho(X_s, X_i)\right],$$

where X is a set of features in a dataset, $F(Y, X_i)$ is an F value (e.g., of an F-test) between a feature and a target variable Y, and $$\left[\frac{1}{|S|}\sum_{X_s \in S} \rho(X_s, X_i)\right]$$

is an average correlation between the feature and all other features in the selected set S.

Using a rank-order formula, the MRMR feature selection model may iteratively select features up to a stopping number (k). The only value that changes between iterations is the average correlation between features in the selected set S and each of the remaining non-selected features. For each iteration, the feature with a maximum rank-order score is selected into the selected set S. After k features are selected, the MRMR feature selection model terminates, the remaining non-selected features are removed from the dataset, and the data can be passed to any downstream machine learning model for optimization. The MRMR feature selection model is highly customizable to many downstream machine learning models and therefore is compatible with either classification or regression machine learning models.

In some implementations, the bias mitigation system 110 may calculate the bias measure (B) based on the feature data and a bias metric. In some implementations, the bias metric may be Cohen's D, denoted by d(·, ·), which is an effect size metric common in group-based research within the social sciences. The purpose of including this metric is to identify distributional differences between protected groups among features. Cohen's D may provide several desirable qualities, such as directly addressing a cause of bias (e.g., distributional differences), being symmetrical around zero, meaning selection of a majority group is not required, and utilizing pooled standard deviation, which helps account for differences in group sizes. The bias measure (B) may result in multiple pairwise comparison scores, which may be reduced using the average (e.g., equal weighting) of the pairwise comparison scores. In some implementations, the bias mitigation system 110 may calculate the bias measure (B), as follows:

$$B(X_i) = \frac{1}{2}\Big(\sum_{1 \le p, q \le |Sex|} |d(M_{i,Sex,p}, M_{i,Sex,q})| + \sum_{1 \le s, t \le |Race|} |d(M_{i,Race,s}, M_{i,Race,t})|\Big),$$

where $M_{i,j,k}$ is a set of values of feature X, for observations with a protected attribute j equal to k.

Figure 1G:
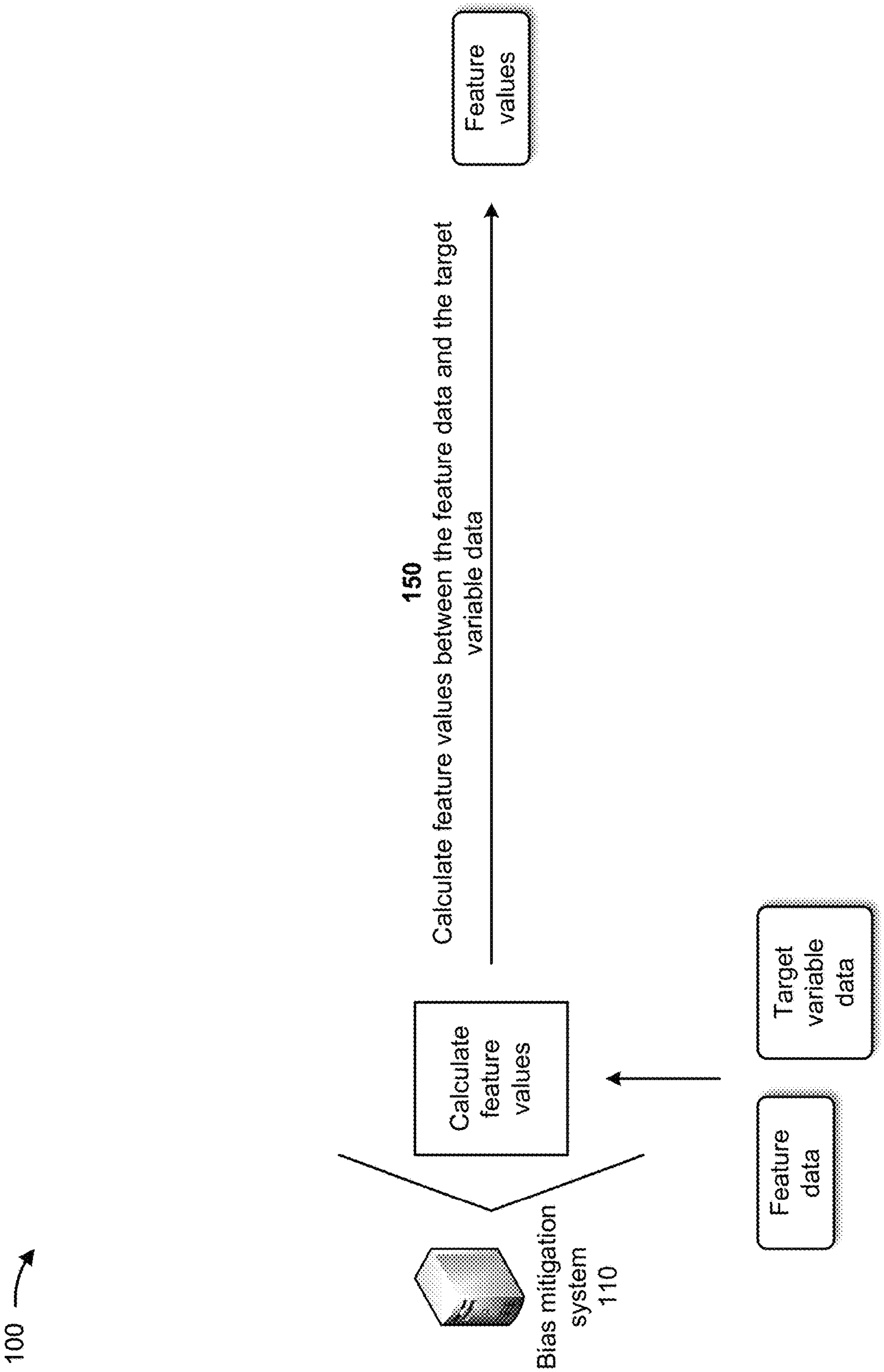

As shown in FIG. 1G, and by reference number 150, the bias mitigation system 110 may calculate feature values between the feature data and the target variable data. For example, the bias mitigation system 110 may utilize the MRMR feature selection model to calculate the feature values F(Y, X) between the feature data and the target variable data, where X is a set of features in a dataset, and $F(Y, X_i)$ is an F value between a feature and a target variable Y.

Figure 1H:
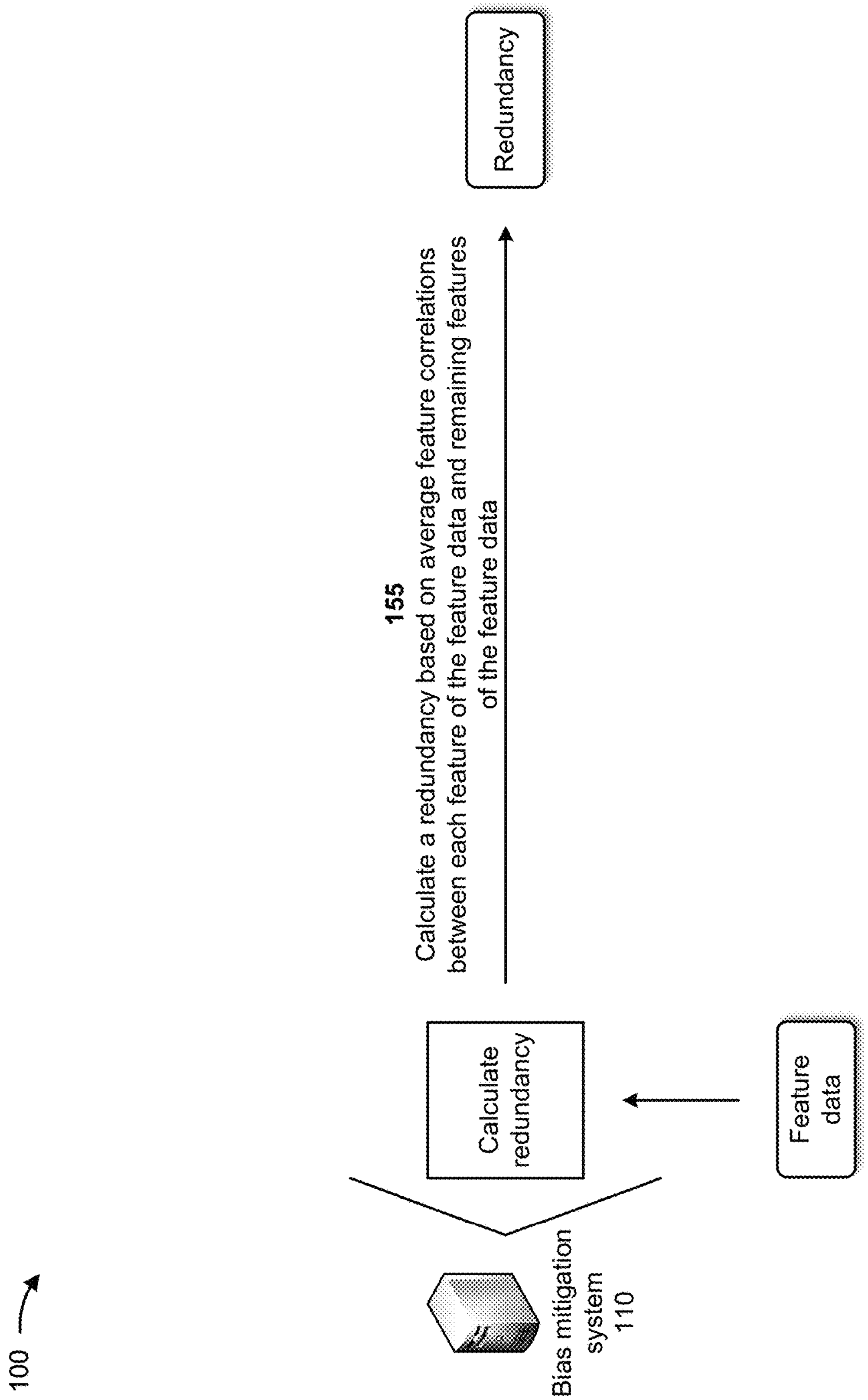

As shown in FIG. 1H, and by reference number 155, the bias mitigation system 110 may calculate a redundancy based on average feature correlations between each remaining feature of the feature data and remaining features of the feature data (e.g., the features in a selected set S). For example, the bias mitigation system 110 may calculate the average feature correlations between each feature of the feature data and remaining features of the feature data, as described above:

$$\left[\frac{1}{|S|}\sum_{X_s \in S}\rho(X_s, X_i)\right].$$

In some implementations, the redundancy may correspond to the average correlations between each remaining feature of the feature data and the features in the selected set S (e.g., $$\left[\frac{1}{|S|}\sum_{X_s \in S}\rho(X_s, X_i)\right]).$$

Figure 1I:
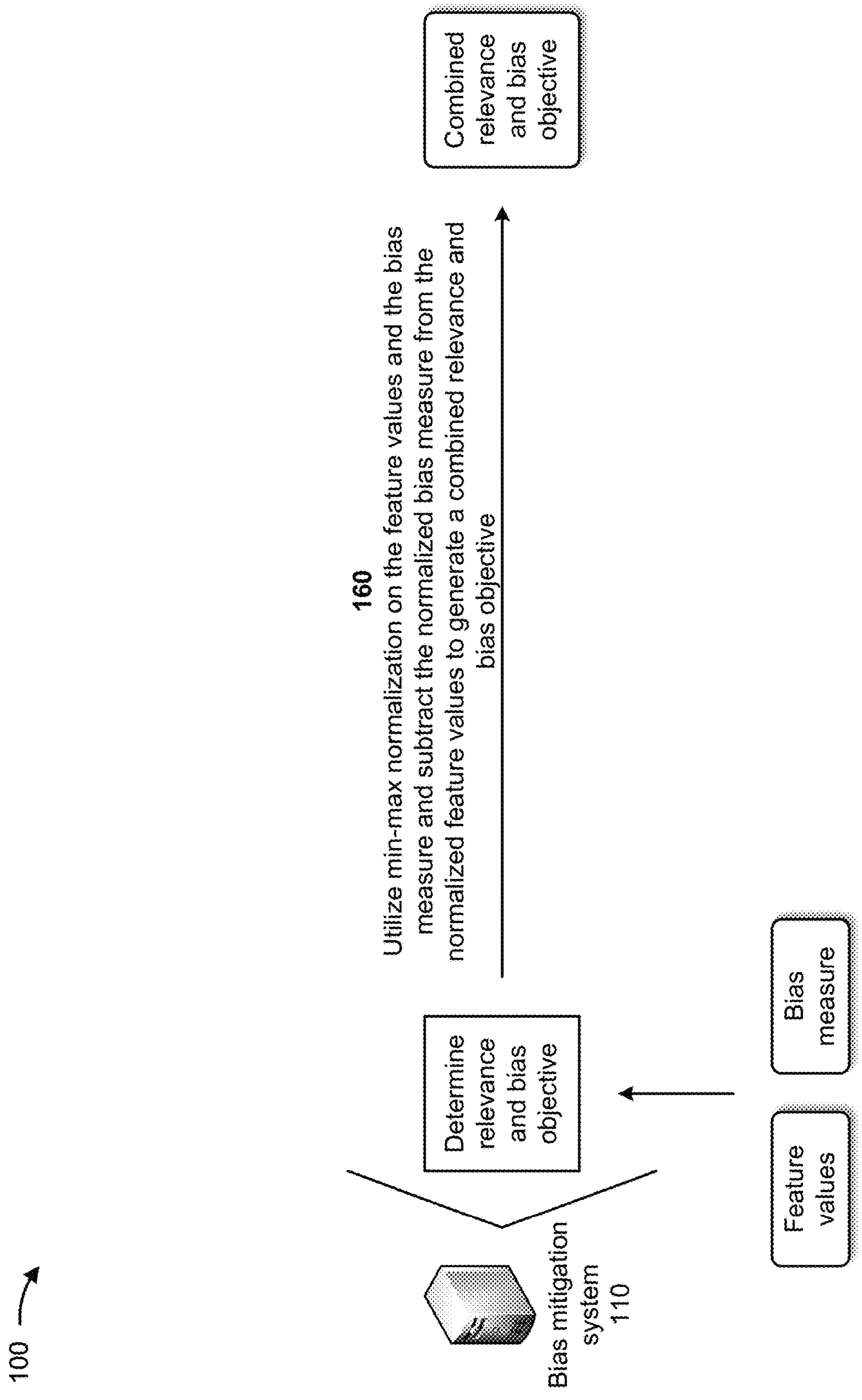

As shown in FIG. 1I, and by reference number 160, the bias mitigation system 110 may utilize normalization (e.g., min-max normalization) on the feature values and the bias measure and may subtract the normalized bias measure from the normalized feature values to generate a combined relevance and bias objective. For example, the bias mitigation system 110 may incorporate bias into the MRMR feature selection model using penalization or Lagrangian duality. In some implementations, the bias mitigation system 110 may utilize min-max normalization on relevance and reduced bias scores, and may subtract the bias from a performance score. The bias mitigation system 110 may control a level of influence for a penalization term through a hyperparameter (λ), which may be set to a value between zero and one. In some implementations, the bias mitigation system 110 may utilize the min-max normalization on the feature values and the bias measure and may subtract the normalized bias measure from the normalized feature values to generate the combined relevance and bias objective, as follows:

$$((1-\lambda)\cdot \text{normalize}_{min\text{-}max}(F(Y, X_i)) - \lambda \cdot \text{normalize}_{min\text{-}max}(B(X_i)),$$

where $\text{normalize}_{min\text{-}max}$ represents a min-max normalization of measures across all features.

Figure 1J:
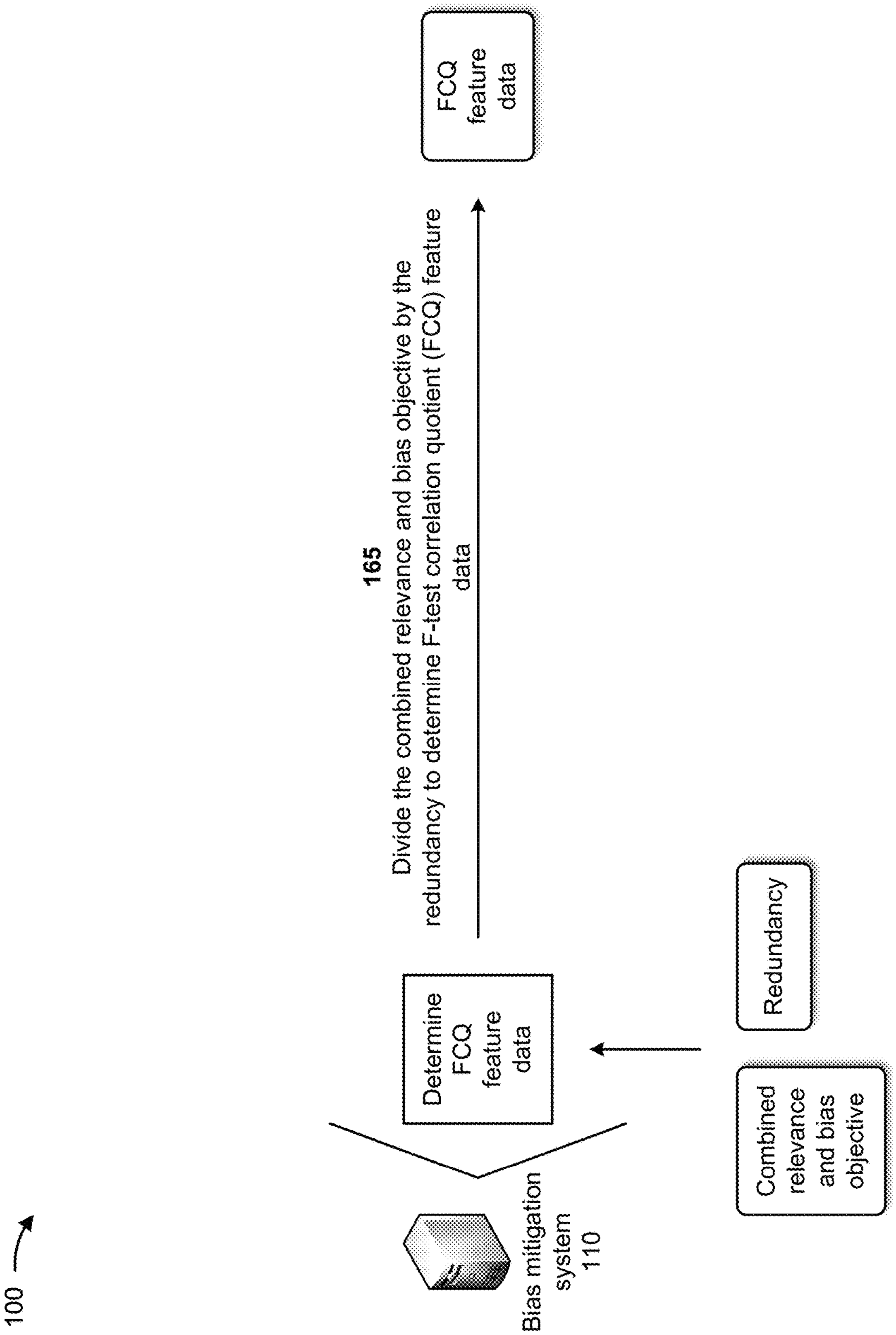

As shown in FIG. 1J, and by reference number 165, the bias mitigation system 110 may divide the combined relevance and bias objective by the redundancy to determine FCQ feature data. For example, the bias mitigation system 110 may divide the combined relevance and bias objective (e.g., $((1-\lambda)\cdot\text{normalize}_{min\text{-}max}(F(Y, X_i))-\lambda.\ \text{normalize}_{min\text{-}max}(B(X_i)))$ by the redundancy $$\left(\text{e.g., }\left[\frac{1}{|S|}\sum_{X_s \in S}\rho(X_s, X_i)\right]\right)$$

to determine the FCQ feature data ($F_{FCQ}$), as follows:

$$F_{FCQ} = \Big((1-\lambda)\cdot \text{normalize}_{min\text{-}max}(F(Y, X_i)) -$$

-continued $$\lambda \cdot \text{normalize}_{min\text{-}max}(B(X_i))\Big/\left[\frac{1}{|S|}\sum_{X_s \in S}\rho(X_s, X_i)\right].$$

In some implementations, the bias mitigation system 110 may add a grid-search method to tune the stopping number (k) (e.g., a quantity of features to include in a final set, as a hyperparameter). The bias mitigation system 110 may utilize minimum and maximum settings and may create an even distribution between the settings to create a search vector. With this addition, the bias mitigation system 110 may produce a final set of models. The bias mitigation system 110 may select a final model from the final set of models by utilizing a weighted reduction of final performance scores to rank the models.

Figure 1K:
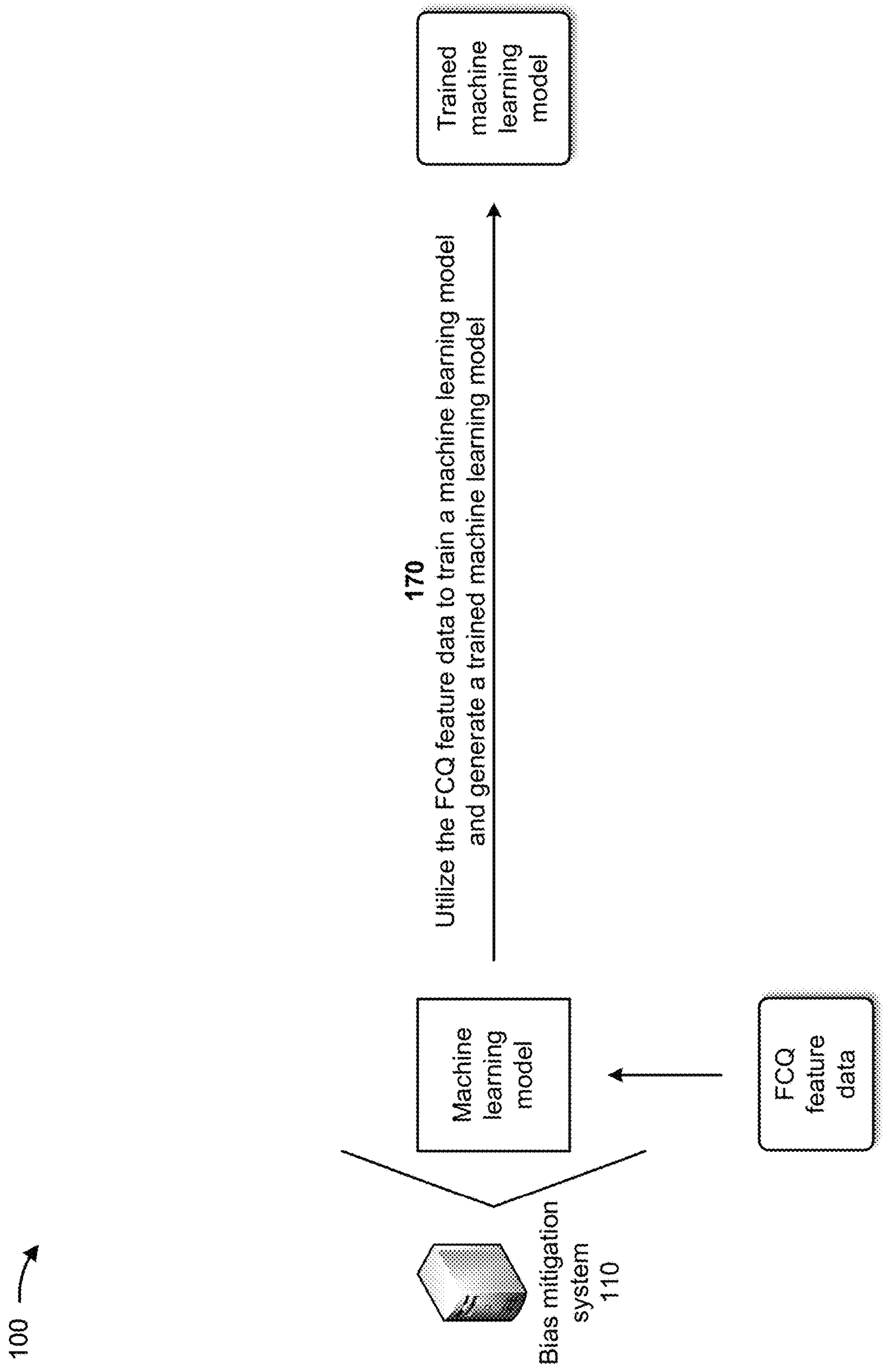

As shown in FIG. 1K, and by reference number 170, the bias mitigation system 110 may utilize the FCQ feature data to train a machine learning model and generate a trained machine learning model. For example, the bias mitigation system 110 may train the machine learning model with the FCQ feature data to generate the trained machine learning model. In some implementations, the machine learning model may include any type of machine learning model (e.g., may be modal agnostic). In some implementations, the bias mitigation system 110 may utilize the trained machine learning model to make one or more predictions (e.g., with reduced bias relative to current approaches).

In some implementations, the bias mitigation system 110 may train a multi-objective set of machine learning models and may utilize the observation data to generate a Pareto optimal set of machine learning models. In some implementations, the bias mitigation system 110 may apply a multi-objective decomposition, either uniform or weighted, to a set of machine learning models in order to rank order and/or select a best solution from the set based on user-specified preferences.

In this way, the bias mitigation system 110 mitigates bias in machine learning models. For example, the bias mitigation system 110 may expand upon previous bias mitigation approaches, and may distinguish between multi-attribute mitigation, intersectional mitigation, and multi-objective analysis. The bias mitigation system 110 may consider multiple protected attributes simultaneously in both model training and evaluation, and may demonstrate how to programmatically apply these concepts by modifying a feature selection model to mitigate model bias and extending a reweighting-based bias mitigation model to handle intersectional protected attributes. The bias mitigation system 110 may provide a more fine-grained, multi-attribute evaluation when determining if machine learning models have achieved sufficient bias mitigation. Thus, the bias mitigation system 110 may conserve computing resources, networking resources, and/or other resources that would have otherwise been consumed by failing to generate unbiased machine learning models, erroneously utilizing biased results generated by biased machine learning models, attempting to correct biased machine learning models, failing to identify biased machine learning models, and/or the like.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
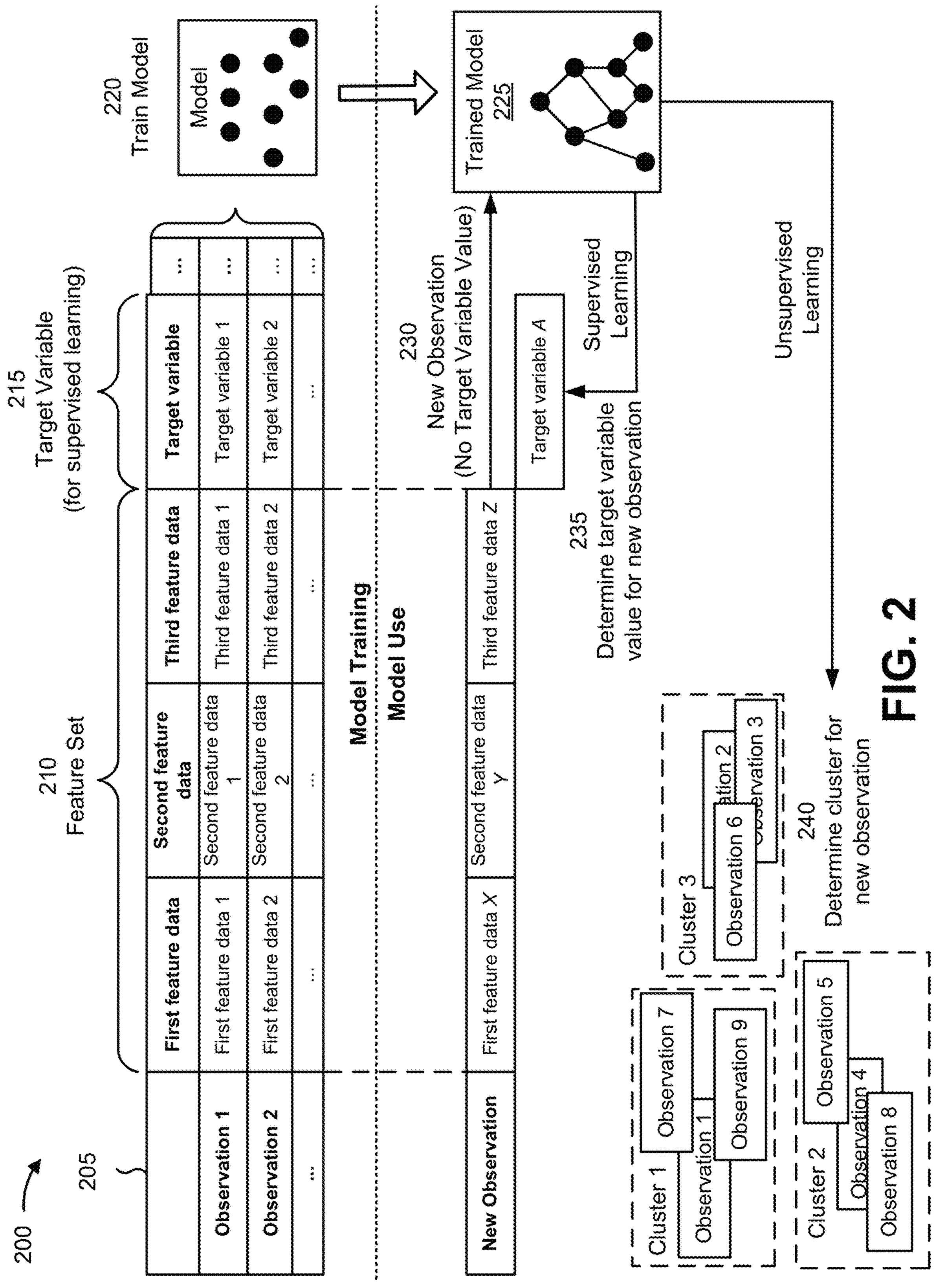
FIG. 2 is a diagram illustrating an example of training and using a machine learning model.

FIG. 2 is a diagram illustrating an example 200 of training and using a machine learning model in connection with systems and methods for mitigating bias in machine learning models. In some implementations, the bias mitigation system 110 may perform categorical variable encoding of inputs provided to a machine learning model so that the bias mitigation system 110 is model agnostic. The machine learning model training and usage described herein may be performed using a machine learning system. The machine learning system may include or may be included in a computing device, a server, a cloud computing environment, or the like, such as the bias mitigation system 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the bias mitigation system 110, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the bias mitigation system 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of first feature data, a second feature of second feature data, a third feature of third feature data, and so on. As shown, for a first observation, the first feature may have a value of first feature data 1, the second feature may have a value of second feature data 1, the third feature may have a value of third feature data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable has a value of target variable 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first feature data X, a second feature of second feature data Y, a third feature of third feature data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of target variable A for the target variable for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first feature data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second feature data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to mitigate bias in machine learning models. The machine learning system may enable recognition and/or identification of tens, hundreds, thousands, or millions of features and/or feature values for tens, hundreds, thousands, or millions of observations, thereby increasing accuracy and consistency and reducing delay associated with mitigating bias in machine learning models relative to requiring computing resources to be allocated for tens, hundreds, or thousands of operators to manually mitigate bias in machine learning models using the features or feature values.

As indicated above, FIG. 2 is provided as an example. Other examples may differ from what is described in connection with FIG. 2.

Figure 3:
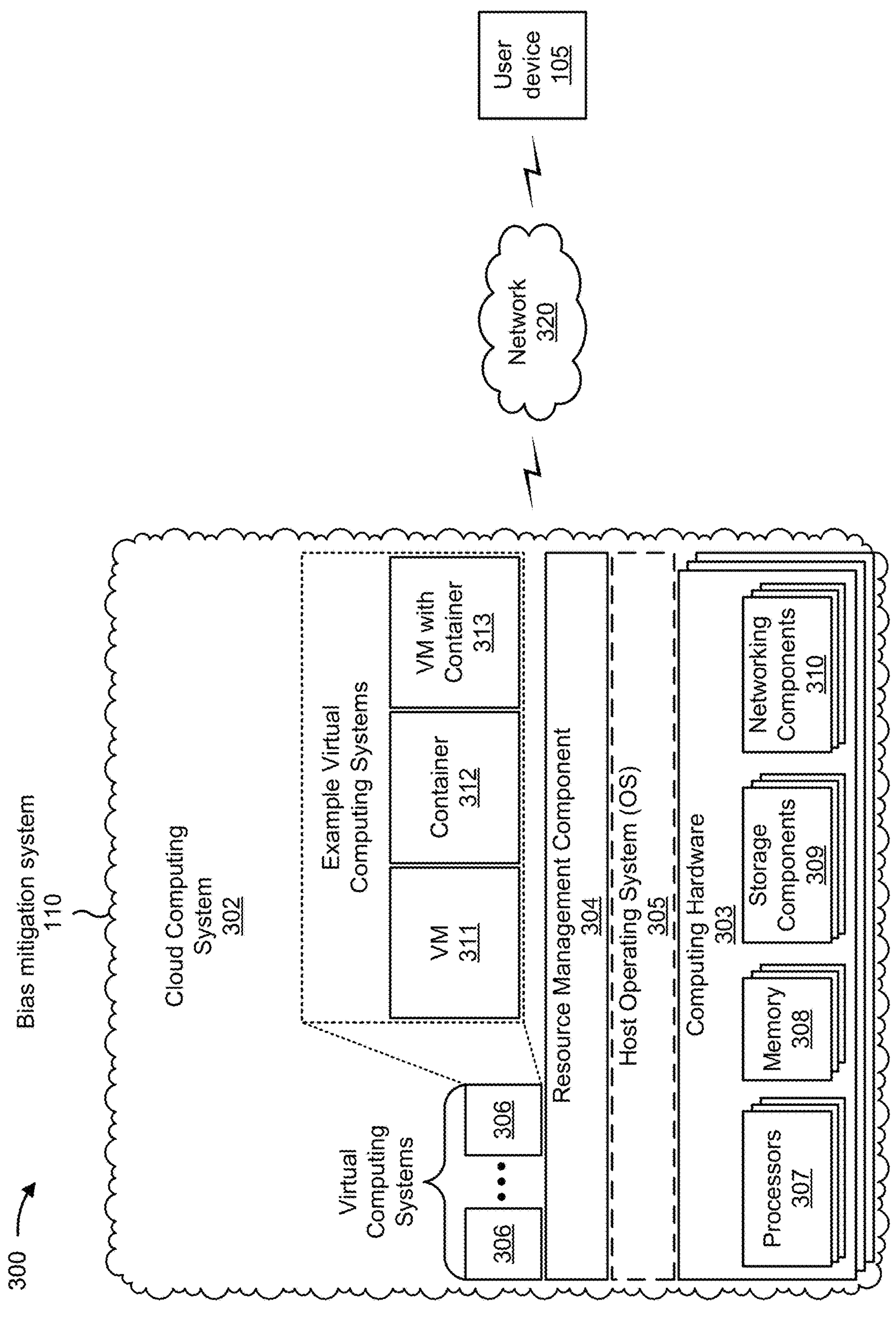
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the bias mitigation system 110, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the bias mitigation system 110 may include one or more elements 303-313 of the cloud computing system 302, may execute within the cloud computing system 302, and/or may be hosted within the cloud computing system 302, in some implementations, the bias mitigation system 110 may not be cloud-based (e.g., may be implemented outside of a cloud computing system) or may be partially cloud-based. For example, the bias mitigation system 110 may include one or more devices that are not part of the cloud computing system 302, such as the device 400 of FIG. 4, which may include a standalone server or another type of computing device. The bias mitigation system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
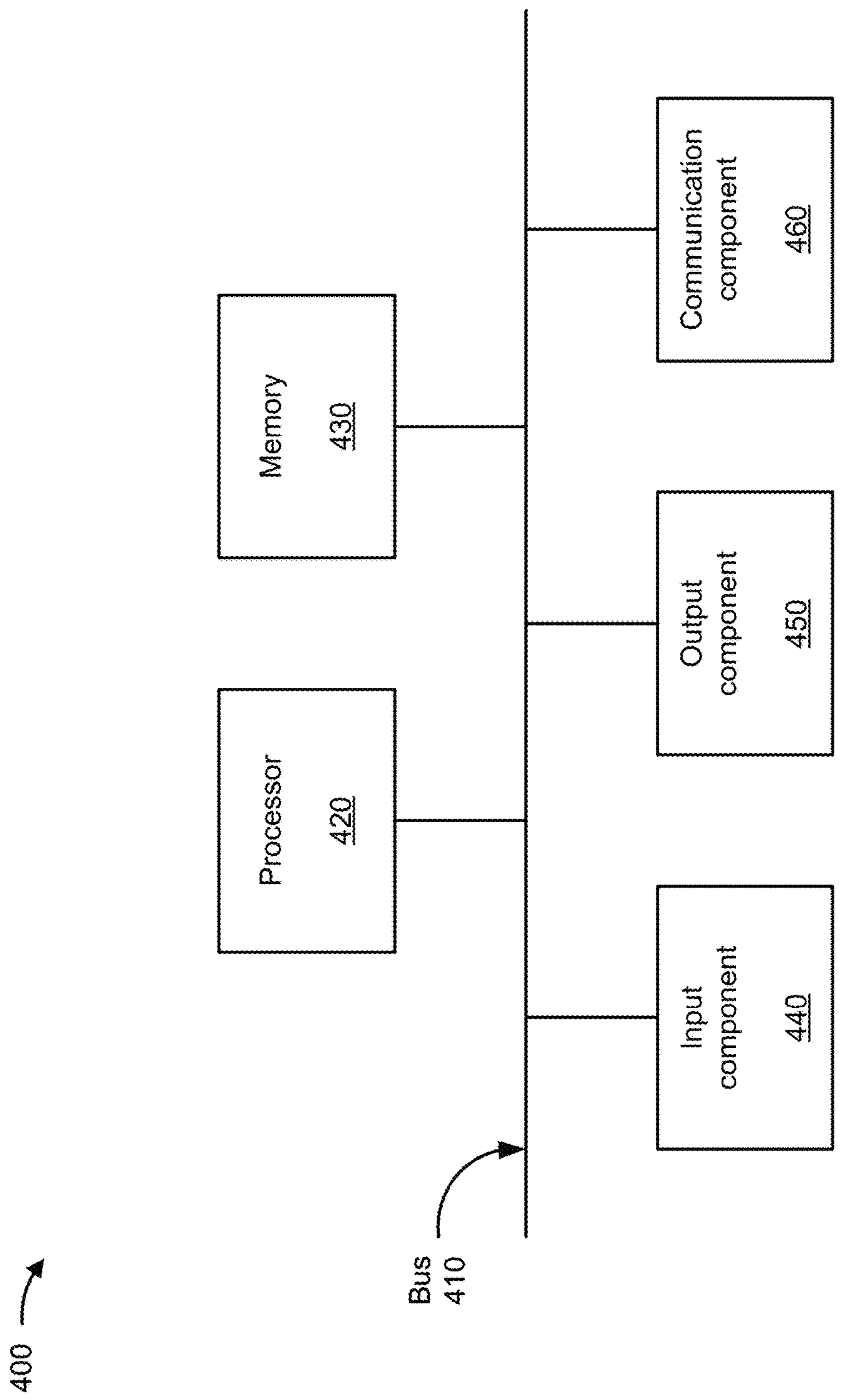
FIG. 4 is a diagram of example components of one or more devices of FIG. 3.

FIG. 4 is a diagram of example components of a device 400, which may correspond to the user device 105 and/or the bias mitigation system 110. In some implementations, the user device 105 and/or the bias mitigation system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
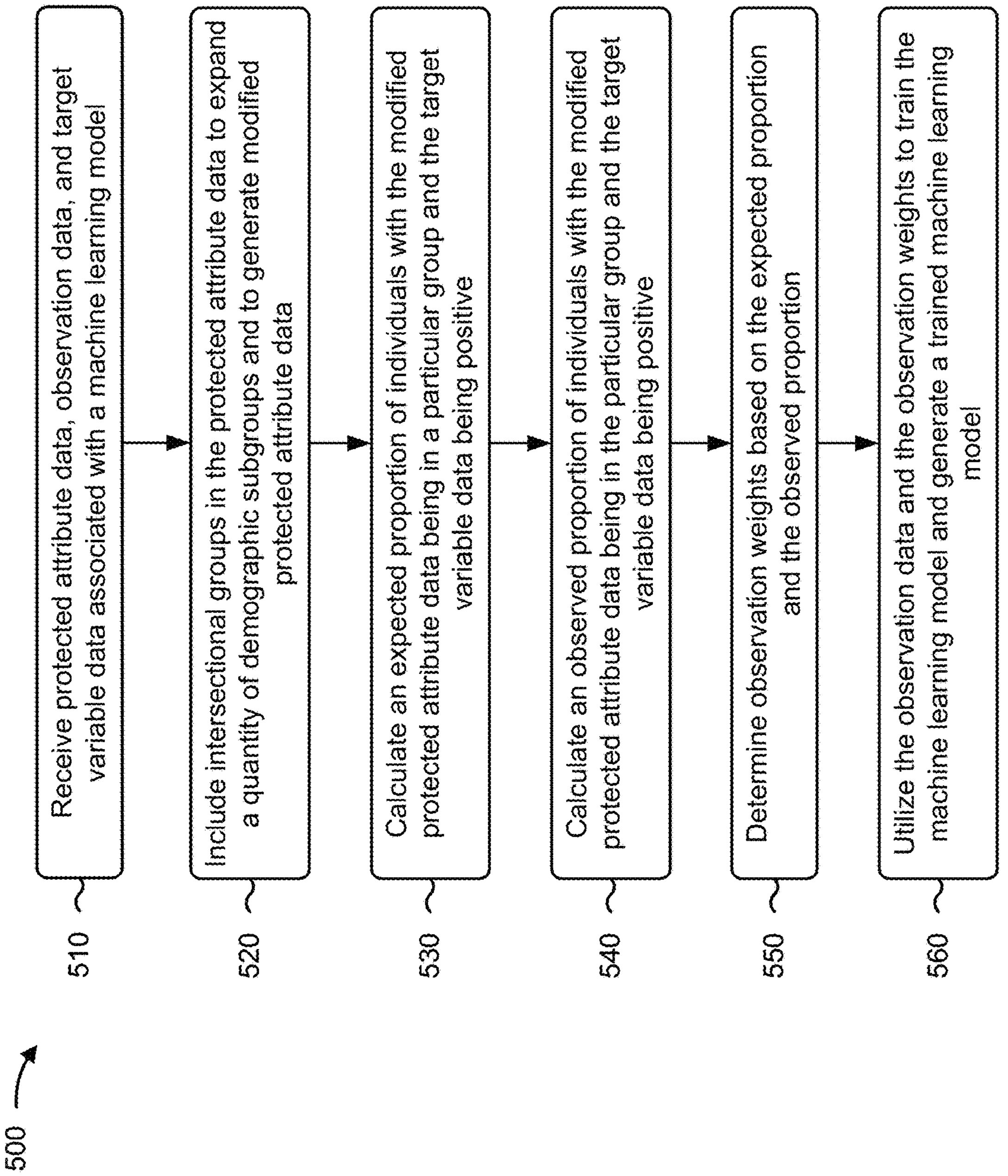
FIG. 5 is a flowchart of an example process for mitigating bias in machine learning models.

FIG. 5 is a flowchart of an example process 500 for mitigating bias in machine learning models. In some implementations, one or more process blocks of FIG. 5 may be performed by a device (e.g., the bias mitigation system 110). In some implementations, one or more process blocks of FIG. 5 may be performed by another device or a group of devices separate from or including the device, such as a user device (e.g., the user device 105), and/or the like. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving protected attribute data, observation data, and target variable data associated with a machine learning model (block 510). For example, the device may receive protected attribute data, observation data, and target variable data associated with a machine learning model, as described above.

As further shown in FIG. 5, process 500 may include including intersectional groups in the protected attribute data to expand a quantity of demographic subgroups and to generate modified protected attribute data (block 520). For example, the device may include intersectional groups in the protected attribute data to expand a quantity of demographic subgroups and to generate modified protected attribute data, as described above. In some implementations, the intersectional groups include two or more sensitive groups that include the sensitive group. In some implementations, the intersectional groups include intersectional conditional probabilities in the protected attribute data.

As further shown in FIG. 5, process 500 may include calculating an expected proportion of individuals with the modified protected attribute data being in a sensitive group and the target variable data being positive (block 530). For example, the device may calculate an expected proportion of individuals with the modified protected attribute data being in a sensitive group and the target variable data being positive, as described above.

As further shown in FIG. 5, process 500 may include calculating an observed proportion of individuals with the modified protected attribute data being in the sensitive group and the target variable data being positive (block 540). For example, the device may calculate an observed proportion of individuals with the modified protected attribute data being in the sensitive group and the target variable data being positive, as described above.

As further shown in FIG. 5, process 500 may include determining observation weights based on the expected proportion and the observed proportion (block 550). For example, the device may determine observation weights based on the expected proportion and the observed proportion, as described above. In some implementations, determining the observation weights based on the expected proportion and the observed proportion includes dividing the expected proportion by the observed proportion to determine the observation weights.

As further shown in FIG. 5, process 500 may include utilizing the observation data and the observation weights to train the machine learning model and generate a trained machine learning model (block 560). For example, the device may utilize the observation data and the observation weights to train the machine learning model and generate a trained machine learning model, as described above. In some implementations, utilizing the observation data and the observation weights to train the machine learning model and generate the trained machine learning model includes applying the observation weights to the observation data to obtain weighted observation data, and training the machine learning model with the weighted observation data to generate the trained machine learning model. In some implementations, the machine learning model is a classifier machine learning model.

In some implementations, process 500 includes utilizing the trained machine learning model to make one or more predictions.

In some implementations, process 500 includes receiving target variable data and feature data associated with another machine learning model; calculating a bias measure based on the feature data and a bias metric; calculating feature values between the feature data and the target variable data; calculating a redundancy based on average feature correlations between each feature of a set of features included in the feature data and remaining features of the set of features included in the feature data; utilizing min-max normalization on the feature values and the bias measure to generate normalized feature values and a normalized bias measure; subtracting the normalized bias measure from the normalized feature values to generate a combined relevance and bias objective; dividing the combined relevance and bias objective by the redundancy to determine F-test correlation quotient (FCQ) feature data; and utilizing the FCQ feature data to train the other machine learning model and generate another trained machine learning model.

In some implementations, the bias metric is Cohen's D. In some implementations, the bias metric is associated with two or more protected groups. In some implementations, the bias measure identifies distributional differences between protected groups among the feature data. In some implementations, the bias measure generates multiple pairwise-comparisons between the feature data.

In some implementations, utilizing the min-max normalization on the feature values and the bias measure to generate the normalized feature values and the normalized bias measure includes determining a hyperparameter associated with the min-max normalization, and generating the normalized feature values and the normalized bias measure based on the hyperparameter. In some implementations, process 500 includes utilizing the other trained machine learning model to make one or more predictions.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, protected attribute data, observation data, and target variable data associated with a machine learning model;

including, by the device, intersectional groups in the protected attribute data to expand a quantity of demographic subgroups and to generate modified protected attribute data, the modified protected attribute data representing an encoding of intersections of multiple protected attributes;

calculating, by the device, an expected proportion of individuals with the modified protected attribute data being in a particular group and the target variable data being positive;

calculating, by the device, an observed proportion of individuals with the modified protected attribute data being in the particular group and the target variable data being positive;

determining, by the device, observation weights based on the expected proportion and the observed proportion; and utilizing, by the device, the observation data and the observation weights to train the machine learning model and generate a trained machine learning model, wherein utilizing the observation data and the observation weights to train the machine learning model and generate the trained machine learning model comprises:

applying the observation weights to the observation data to obtain weighted observation data; and training the machine learning model with the weighted observation data to generate the trained machine learning model.

2. The method of claim 1, wherein the intersectional groups include two or more particular groups that include the particular group.

3. The method of claim 1, wherein the intersectional groups include intersectional conditional probabilities in the protected attribute data.

4. The method of claim 1, wherein determining the observation weights based on the expected proportion and the observed proportion comprises:

dividing the expected proportion by the observed proportion to determine the observation weights.

5. The method of claim 1, wherein the machine learning model is a classifier machine learning model.

6. The method of claim 1, further comprising:

utilizing the trained machine learning model to make one or more predictions.

7. The method of claim 1, wherein including the intersectional groups in the protected attribute data comprises:

modifying a pre-processing bias mitigation model to encode the protected attribute data as intersectional combinations of two or more protected attributes.

8. The method of claim 1, wherein the particular group is an intersectional group.

9. A device, comprising:

one or more processors configured to:

receive target variable data and feature data associated with a machine learning model, wherein the feature data includes data representing an encoding of intersections of multiple protected attributes;

calculate a bias measure based on the feature data and a bias metric;

calculate feature values between the feature data and the target variable data;

calculate a redundancy based on average feature correlations between each feature of a set of features included in the feature data and remaining features of the set of features included in the feature data;

utilize min-max normalization on the feature values and the bias measure to generate normalized feature values and a normalized bias measure;

subtract the normalized bias measure from the normalized feature values to generate a combined relevance and bias objective;

divide the combined relevance and bias objective by the redundancy to determine F-test correlation quotient (FCQ) feature data; and utilize the FCQ feature data to train the machine learning model and generate a trained machine learning model configured to make predictions with reduced bias.

10. The device of claim 9, wherein the bias metric is Cohen's D.

11. The device of claim 9, wherein the bias metric is associated with two or more protected groups.

12. The device of claim 9, wherein the bias measure identifies distributional differences between protected groups among the feature data.

13. The device of claim 9, wherein the bias measure generates multiple pairwise-comparisons between the feature data.

14. The device of claim 9, wherein the one or more processors, when utilizing the min-max normalization on the feature values and the bias measure to generate the normalized feature values and the normalized bias measure, are configured to:

determine a hyperparameter associated with the min-max normalization; and generate the normalized feature values and the normalized bias measure based on the hyperparameter.

15. The device of claim 9, further comprising:

utilizing the trained machine learning model to make one or more predictions.

16. A non-transitory computer-readable medium storing a set of instructions, the set of instructions comprising:

one or more instructions that, when executed by one or more processors of a device, cause the device to:

receive protected attribute data, observation data, and first target variable data associated with a first machine learning model;

include intersectional groups in the protected attribute data to expand a quantity of demographic subgroups and to generate modified protected attribute data, the modified protected attribute data representing an encoding of intersections of multiple protected attributes;

calculate an expected proportion of individuals with the modified protected attribute data being in a particular group and the first target variable data being positive;

calculate an observed proportion of individuals with the modified protected attribute data being in the particular group and the first target variable data being positive;

determine observation weights based on the expected proportion and the observed proportion; and utilize the observation data and the observation weights to train the first machine learning model and generate a trained first machine learning model, wherein the one or more instructions, that cause the device to utilize the observation data and the observation weights to train the first machine learning model and generate the trained first machine learning model, cause the device to:

apply the observation weights to the observation data to obtain weighted observation data; and train the first machine learning model with the weighted observation data to generate the trained first machine learning model.

17. The non-transitory computer-readable medium of claim 16, wherein the one or more instructions, that cause the device to determine the observation weights based on the expected proportion and the observed proportion, cause the device to:

divide the expected proportion by the observed proportion to determine the observation weights.

18. The non-transitory computer-readable medium of claim 16, wherein the one or more instructions further cause the device to:

utilize the trained first machine learning model to make one or more predictions.

19. The non-transitory computer-readable medium of claim 16, wherein the one or more instructions further cause the device to:

receive second target variable data and feature data associated with a second machine learning model;

calculate a bias measure based on the feature data and a bias metric;

calculate feature values between the feature data and the second target variable data;

calculate a redundancy based on average feature correlations between each feature of a set of features included in the feature data and remaining features of the set of features included in the feature data;

utilize min-max normalization on the feature values and the bias measure to generate normalized feature values and a normalized bias measure;

subtract the normalized bias measure from the normalized feature values to generate a combined relevance and bias objective;

divide the combined relevance and bias objective by the redundancy to determine F-test correlation quotient (FCQ) feature data; and utilize the FCQ feature data to train the second machine learning model and generate a trained second machine learning model.

20. The non-transitory computer-readable medium of claim 19, wherein the one or more instructions further cause the device to:

utilize the trained second machine learning model to make one or more predictions.

* * * * *